United States Patent [19]

Evans

[11] 4,071,337

[45] Jan. 31, 1978

[54] FILTER UNIT HAVING A CONSTANT RATE PURGING CYCLE

[75] Inventor: Bryce B. Evans, Jackson, Mich.

[73] Assignee: Aeroquip Corporation, Jackson, Mich.

[21] Appl. No.: 761,817

[22] Filed: Jan. 24, 1977

[51] Int. Cl.² .................... B01D 53/04; B01D 46/00
[52] U.S. Cl. .................................... 55/212; 55/303; 55/313; 55/314; 55/316; 55/387; 55/DIG. 17; 210/282; 210/DIG. 6
[58] Field of Search ................. 55/21, 31, 32, 62, 212, 55/301, 302, 303, 313, 314, 316, 387, 389, 163, DIG. 17; 210/282, DIG. 6, DIG. 7

[56] References Cited

U.S. PATENT DOCUMENTS

| 3,358,842 | 12/1967 | Rosaen | 55/302 X |
| 3,464,186 | 9/1969 | Hankison et al. | 55/316 X |
| 3,472,000 | 10/1969 | Glass et al. | 55/387 X |
| 3,592,563 | 7/1971 | Glass et al. | 55/316 X |
| 3,593,498 | 7/1971 | Semon | 55/387 X |
| 3,680,283 | 8/1972 | Jones, Jr. | 55/302 X |
| 3,705,480 | 12/1972 | Wireman | 55/316 X |
| 3,832,831 | 9/1974 | Ritchie et al. | 55/316 X |

Primary Examiner—Charles N. Hart
Assistant Examiner—Robert H. Spitzer
Attorney, Agent, or Firm—Collins, Oberlin & Darr

[57] ABSTRACT

A filtering unit for use in a fluid pressure system having an inlet port for admitting fluid flowing under pressure through a filter and a desiccant bed to a distributing chamber. During the system's compression cycle, a portion of the fluid under pressure flows from the distributing chamber through metering orifices into a purge cylinder moving a piston therein to the bottom of the purge cylinder. During the system's purging cycle, fluid flowing under pressure is admitted to the bottom of the purge cylinder moving the piston towards the metering orifices causing the pressurized fluid therein to flow at a constant rate in a reverse direction through the filter and desiccant bed into a sump which is exhausted to the atmosphere through a drain valve for renewing the filter and desiccant bed. Also, a one-way valve is provided between the inlet port and the distributing chamber to permit the fluid flowing under pressure to bypass the filter and desiccant bed in the event they become clogged.

9 Claims, 2 Drawing Figures

FILTER UNIT HAVING A CONSTANT RATE PURGING CYCLE

BACKGROUND OF THE INVENTION

1. Field of the Invention

This invention generally relates to fluid filters for use in pressurized fluid systems and more particularly to apparatus for purging contaminants from and drying a desiccant material within a filter.

2. Description of the Prior Art

A conventional fluid filter for use in compressed air systems of the general type described herein is shown in U.S. Pat. No. 3,832,831, issued on Sept. 3, 1974. Such prior art air filters normally purge and reactivate a filter and desiccant medium contained therein by an unrestrained, variable rate, reverse air flow exhausting to the ambient atmosphere. In purging such conventional air filters, a drain valve is instantaneously unseated, resulting in a sudden decompression of the filtering unit. The pressurized air reacts to the sudden decompression of the filtering unit by flowing at a high volume and varying rate in a reverse direction through the filtering unit. The rapid unrestrained flow of decompressed air through the filter and desiccant bed tends to powder or pulverize and destroy the individual desiccant beads conventionally comprising the desiccant material, thus shortening its life. This, of course, results in the disadvantage of the compressed air system frequently being out of service for replacement of the desiccant bed.

Attempts have been made in the past to reduce the velocity at which decompressed air flows in reverse direction through the desiccant bed as by providing a metering valve in the system to control the volume of purging air permitted to flow through the filter, one such system being shown in U.S. Pat. No. 3,464,186, issued on Sept. 2, 1969. However, even though the volume of purging air is metered or restricted to the filter, its flow rate through the filter varies, which is detrimental to the life of the desiccant medium.

It has been discovered that when the reverse flow of air through the filter is controlled at a high volume constant velocity, its filter unit is more effectively cleaned and the life of the desiccant material is substantially prolonged.

SUMMARY OF THE INVENTION

Briefly, the fluid filter unit according to this invention overcomes the aforementioned disadvantage by providing the unit with a device wherein purging air is caused to flow at a constant rate which substantially prolongs the life of the desiccant medium employed therein. Generally, the filter unit comprises an outer shell having an inlet port for admitting pressurized air through an annular filter for separating contaminants from the air and a desiccant bed for drying the air, into a distributing chamber wherein a portion of the pressurized air enters a purge cylinder through metering orifices while the remainder exits through an outlet port. The purge cylinder includes a piston for supplying air at a high volume and constant velocity to the distributing chamber when the filter unit is purged. During a compression cycle of a compressed air system, air flows from a source under pressure through the filter and desiccant bed into the distributing chamber and then into the purge cylinder, moving the piston to the bottom of the purge cylinder. During the purging cycle, air under pressure is admitted through a port at the bottom of the purge cylinder moving the piston towards the top of the cylinder causing the pressurized air therein to flow at a high volume constant rate through the metering orifices into the distributing chamber, then downwardly through the filter and desiccant bed and exiting through a sump provided with a valved drain opening to the ambient atmosphere.

OBJECTS AND ADVANTAGES

An object of this invention is to provide a fluid filter which operates to remove foreign matter from a compressed fluid stream on a compression cycle and which effectively purges the filter of foreign matter by high volume constant rate reverse flow so as to prolong the life of the filter.

Another object of this invention is to provide a fluid filter that is compact, efficient in operation, and easy to manufacture and assemble.

Other objects and advantages will become more apparent during the course of the following description when taken in connection with the accompanying drawings.

BRIEF DESCRIPTION OF THE DRAWINGS

In the drawings, wherein like numerals are employed to designate like parts throughout the same.

DESCRIPTION OF THE PREFERRED EMBODIMENT

Figure 1:
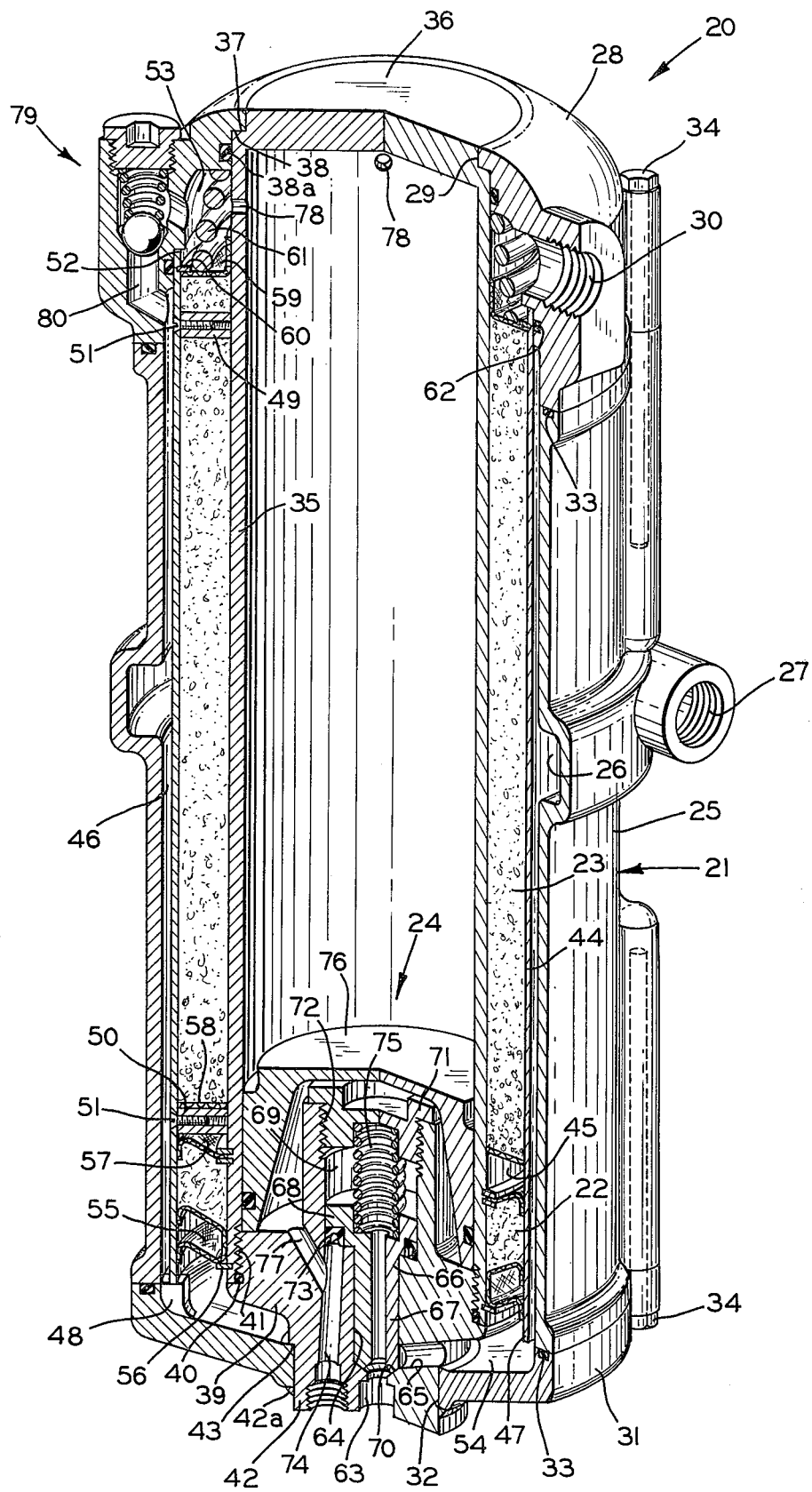
FIG. 1 is an isometric elevational view, partly in section, showing the relationship of the filter elements during a compression cycle.

Although the fluid filtering unit constructed in accordance with this invention will be particularly described in conjunction with a compressed air system, its application is much broader and includes all types of pressurized fluid systems. Generally speaking, the filtering unit is particularly well suited for use in a pressurized air system wherein foreign particles, oil and water vapors, may be entrained in a moving fluid stream.

Referring now to the drawings, the fluid filtering unit, designated in its entirety by the reference numeral 20, comprises an outer cylindrical shell indicated by the reference numeral 21, for encasing an annular filter 22, a dehydrating means or desiccant bed 23, and a novel purging device 24 for producing a high volume, constant velocity, reverse air flow through the filtering unit 20 for renewing the filter 22 and desiccant bed 23.

The outer cylindrical shell 21 includes an intermediate elongated tubular section 25 having an enlarged annular recess 26 provided with an inlet port 27 for admitting compressed air into the shell 21, a cup-shaped top cap 28 having a centrally disposed aperture 29 and an outlet port 30, and a dish-shaped bottom cap 31 having a centrally disposed aperture 32 axially aligned with the aperture 29 in the top cap 28. The walls defining the apertures 28 and 31 receive and support the top and bottom ends of the novel purging device 24 in a concentric relationship within the outer shell 21. The top and bottom caps 28 and 31, respectively, each are sealingly secured to the intermediate section 25 by an O-ring seal 33 and cap bolts 34.

The purging device 24 includes an elongated central cylinder 35 extending between the top cap 28 and the bottom cap 31, and has an enclosed upper end 36 which is provided with a shoulder 37 for abutting a shoulder 38 provided around the periphery of the aperture 29 in the top cap 28. An O-ring seal 38a is provided adjacent the shoulder 38 in the top cap 28 to seal the cylinder 35 to the top cap. The lower end of the cylinder 35 is provided with a closure member 39 which is sealingly secured thereto by a seal 40 and threads 41. The closure member 39 is provided with a depending portion 42 which extends through the aperture 32 of the bottom cap 31 and has a shoulder 43 which abuts the inner surface of the bottom cap to hold the cylinder 35 concentrically within the outer shell 21. The closure member 39 may be sealingly secured to the bottom cap 31 by brazing or the like as indicated at 42a.

A tubular member 44 concentrically surrounds and, together with the central cylinder 35, defines an annular space 45 for receiving the filter 22 and the desiccant bed 23. Also, the tubular member 44 is radially spaced inwardly from the shell 21 and together therewith defines a passageway 46 for directing the flow of air to the filter 22. The lower edge 47 of the tubular member 44 is supported on a plurality of seats 48 (only one shown) provided in the bottom cap 31 and is concentrically arranged around the cylinder 35 by a plurality of upper and lower pegs 49 and 50, respectively, which project inwardly from the interior surface of the tubular member 44. The pegs 49 and 50 are attached to the member 44 by cap screws 51. The tubular member 44 is shorter in length than the cylinder 35 and its upper end 52 engages the top cap 28 so that, together with the upper end of the cylinder 35 they define a distributing chamber 53. The closure member 39 and the bottom cap 31 define a sump 54 at the lower end of the shell 21 into which the passageway 46 opens.

The annular filter 22 is carried at the lower end of the space 45 above the sump 54 and may be fabricated of any suitable material such as steel wool, which will trap oil mists and/or other foreign particles entrained in the flowing air stream, particularly those of light weight which will not drop out of the air stream before the filter 22 is reached. The filter material is supported on the upper leg of a U-shaped ring 55 which is held in the annular space 45 by a retaining ring 56 carried in a groove provided in the exterior surface of the central cylinder 35. The top end of the filter material is contained in the space 45 by an upper ring 57 which is secured to the central cylinder 35 by a pair of closely spaced retaining rings such as the ring 56. The rings 55 and 57 are fabricated from a pervious material for permitting the flow of air therethrough.

A major portion of the space 45 contains the desiccant bed 23 which may be composed of any suitable type of beaded material that does not readily decompose or become pulverized during use. The desiccant bed 23 is carried above the filter 22 on a flat ring 58 which is supported on the lower plurality of pegs 50. A pressure ring 59 resting on the top of the desiccant bed 23, is secured against movement away from the desiccant bed 23 by a retaining ring 60 carried in a groove provided in the interior surface of the tubular member 44. These rings 58 and 59 are also fabricated from a pervious material for the passage of air therethrough. A portion of the pressure ring 59 slidingly engages the exterior surface of the cylinder 35 and a conical compression spring 61 compressed between the top cap 28 and the ring 59 supplies a constant force on the desiccant bed 23. The spring 61 urges the pressure ring 59 downwardly against the desiccant bed 23 to apply compression thereto and this compressive action minimizes vibration and attrition of the individual desiccant beads making up the bed 23 as well as prevents dusting in the beads. Also, it is to be noted that the filter 22 and the desiccant bed 23 may be easily replaced by simply removing the bottom cap 31 from the outer shell 21.

Referring now to FIG. 1, the annular recess 26 defined by the exterior surface of the tubular member 44 and the interior surface of the shell 21 has a cross sectional area greater than the cross sectional area of the inlet port 27. Thus, pressurized air will flow from the recess 26 in a swirling path downwardly through the passageway 46 into the sump 54 and reverse its flow around the lower edge 47 of the tubular member 44, which edge 47 is disposed below the filter 22 so that heavy particles carried by a flowing air stream will drop from there into the sump 54. A seal 62 carried by the top cap 28 above the inlet port 27 engages the exterior surface of the tubular member 44 and prevents upward flow of pressurized air in the passageway 46.

In order to evacuate liquid and foreign particles from the sump 54, the closure member 39 is provided with a drain 63 that opens to the surrounding atmosphere. More specifically, the depending portion 42 of the closure member 39 includes an axially extending centrally disposed bore 64 opening into the drain 63 and a plurality of radially disposed passageways 65 (only one shown) extending between the bore 64 and the sump 54. The drain 63 is opened and closed to the surrounding atmosphere by a pressure operated drain valve 66. Accordingly, the drain valve 66 includes a stem portion 67 that is slidably received in the bore 64 and an enlarged head 68 which functions as a piston in a cylindrical chamber 69 provided in the upper end of the closure member 39. The lower end of the stem 67 is tapered to coact with a tapered valve seat 70 for closing the passageways 65 from the drain 63. The chamber 69 is formed in the closure member 39 by an axially extending counterbore whose open end is closed by a cap 71 attached to the upper end of the closure member 39 by threads 72. The lower surface of the valve head 68 is provided with a cup shaped seal 73 exposed to a source of air under pressure (not shown) through a passageway 74. A coil spring 75 compressed between the top of the valve head 68 and the cap 72, urges the tapered end of the valve stem 67 into engagement with the valve seat 70 in the bore 64. The spring 75 permits, when pressure is applied through the passageway 74, the tapered end of the valve stem 67 to lift from its seat 70 and liquid and other foreign particles to be freed to pass from the sump 54 out through the drain 63 to the atmosphere.

The novel purging device 24 for providing a high volume, constant velocity backflow of air through the filter 22 and desiccant bed 23 also includes a piston 76 which is freely movable within the central cylinder 35. More specifically, the closure member 39 is provided with a pressure admitting passageway 77 which is connected with the passageway 74 and opens into the cylinder 35 for moving the piston 76 toward the upper end of the cylinder 35 when fluid pressure is supplied to move the drain valve 66 from its seated position. The upper end of the cylinder 35 is provided with a plurality of metering orifices 78 which open into the distributing chamber 53 and through which pressurized air is either admitted to or exhausted from the interior of the cylinder 35.

OPERATION

Referring now to FIG. 1 which illustrates the position of the piston 76 during the compression cycle of a pressurized air system, hot, moist, compressed air from a pressure source (not shown) enters the filtering unit 20 through the inlet port 27 into the enlarged annular recess 26 and flows downwardly in a swirling path through the passageway 46, being cooled as it passes the interior surface of shell 21 and thus condensing water or oil vapors entrained therein. The condensed water and oil vapors collect in the sump 54 and pass out the drain 63 when the drain valve 66 is opened. The pressurized air makes a 180° turn upwardly around the lower edge 47 of the tubular member 44 and condensed water and oil drop to the bottom of the sump 54. As the air flows around the lower edge 47 it reverses its flow and because of the increased area of the annular space 45 and sump 56, its velocity will decrease. The air flow reversal and its simultaneous reduction in velocity will cause foreign matter entrained or suspended in the air to fall into the sump 54. The air then passes through the filter 22 which removes additional dirt particles, oil and water mist. The air continues to move upwardly through the desiccant bed 23 which further dries the air, and the thus dried air passes into the distributing chamber 53, exiting through the outlet port 30 to a reservoir tank (not shown) for future use. As the pressurized air enters the distributing chamber 53, a portion will also flow through the metering orifices 78 into the interior of the cylinder 35 moving the piston 76 to the lower end thereof. At this time, the underside of the piston 76 is at atmospheric pressure.

Figure 2:
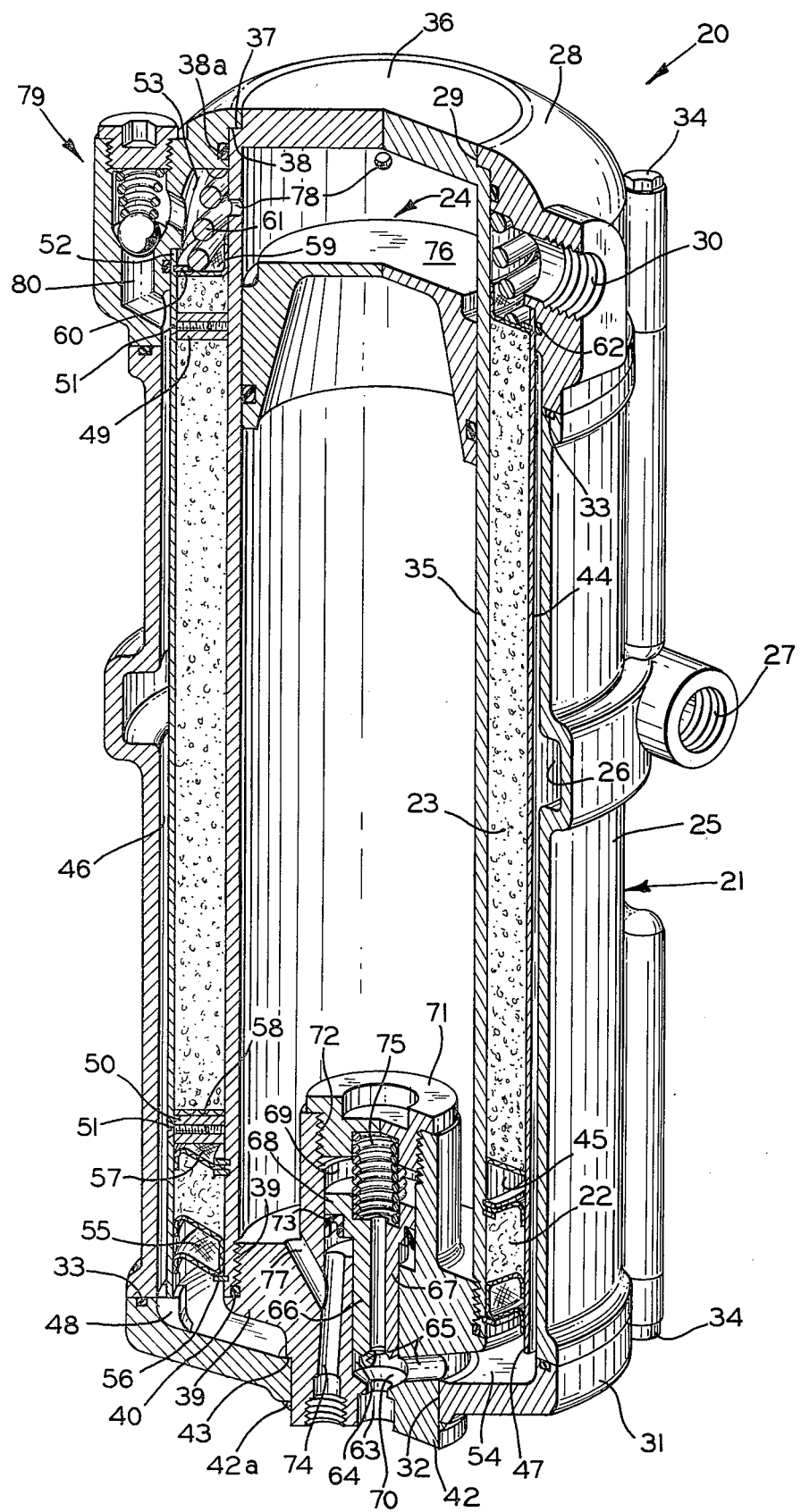
FIG. 2 is a view similar to FIG. 1, but showing the relationship of the filter elements during a purging cycle.

Referring now to FIG. 2, the position of the piston 76 at the end of the purging cycle of the filter unit 20 is illustrated. Conventionally, when the air flowing from a pressure source in a compressed air system is shut off, a drain valve is subjected to the flow of pressurized air causing the valve to move from its seat and open a sump to the surrounding atmosphere. The filtering unit 20, made in accordance with this invention, operates in a somewhat similar manner. More specifically, when the air flowing from a pressure source is shut off, pressurized air from a reservoir tank (not shown) is applied to the drain valve 66 through the passageway 74, causing the drain valve 66 to move from its seat 70 and open the sump 54 to the ambient atmosphere. When the drain valve 66 opens, air pressure in the filtering unit 20 drops to atmospheric conditions as the inlet port 27 is shut off from the pressurized air source and the outlet port 30 is shut off from the reservoir tank. Simultaneously, with the application of pressurized air to the enlarged head 68 of the drain valve 66, pressurized air is applied to the underside of the piston 76 through the admitting passageway 77 which is connected to the passageway 74. When the pressurized air on the underside of the piston 76 is sufficiently greater (normally about two pounds per square inch) than the pressurized air acting on the upper side of the piston 76, the piston will move at a substantially constant rate toward the metering orifices 78, causing a restrained flow of air therethrough. The restrained flow of air through the orifices 78 plus the pressurized air acting on the underside of the piston 76 will maintain a near constant pressure on the upper side of the piston. Since pressurized air is applied substantially simultaneously to the drain valve 66 and the underside of the piston 76, the piston 76 will provide a high volume, near constant rate of air flow through the desiccant bed 23 and the filter 22. The volume of dry compressed air contained within the cylinder 35 at the end of the compression cycle is sufficient to completely regenerate the desiccant bed 23 and the filter 22.

Should the filter 22 or desiccant bed 23 become clogged due to the accumulation of foreign matter wherein the air pressure below the filter 22 builds to excessive levels, a safety valve 79 is provided in the top cap 28. More specifically, the top cap is provided with a passageway 80 extending between the passageway 46 and the distributing chamber 53. The valve 79 is a spring urged ball valve which remains in a closed position under normal pressure levels within the filtering unit 20. Thus, when excessive pressure levels build up, the valve 79 will open, allowing compressed air to bypass the filter 22 and the desiccant bed 23 and flow through the passageway 80 directly into the distributing chamber 53. Thus, compressed air will continue to be supplied to the reservoir storage tank for operation of the compressed air system.

It is to be understood that the form of the invention herewith shown and described is to be taken as an illustrative embodiment only of the same and that various changes in the shape, size and arrangement of the parts may be resorted to without departing from the spirit of the invention.

I claim:

1. In a filtering unit for use in pressurized fluid systems of the type having an outer shell, an annular filter at the lower end of said shell, a dehydrating means thereabove, a distributing chamber at the top of said shell in communication with said filter and said dehydrating means, and a sump including a drain for exhausting said sump in the bottom of said shell, the improvement comprising:
   a. a purge cylinder within said shell;
   b. means for connecting said cylinder to said distributing chamber; and
   c. means in said cylinder for producing a high volume, constant velocity of air flow from said cylinder to said distributing chamber whereby said dehydrating means and said filter are backflushed by air flowing at a high volume and a constant velocity.

2. A filtering unit for use in pressurized fluid systems as claimed in claim 1, wherein said connecting means comprises a plurality of metering orifices.

3. A filtering unit for use in pressurized fluid systems as claimed in claim 2, wherein said constant velocity producing means is a piston which is movable toward said metering orifices.

4. A filtering unit for use in pressurized fluid systems as claimed in claim 3, wherein said piston is freely movable in said cylinder and is moved toward said metering orifices when the fluid pressure on one side of said piston exceeds the fluid pressure on the other side of said piston.

5. A filtering unit for use in pressurized fluid systems as claimed in claim 1, including a safety valve disposed between said sump and said distributing chamber for bypassing said filter and said dehydrating means in the event said filter should become clogged.

6. A filtering unit for use in pressurized fluid systems comprising:
   a. an outer shell having a sump at its lower end and a distributing chamber at its upper end;
   b. a filter within said shell disposed above said sump;
   c. a desiccant bed disposed above said filter;

d. said outer shell having an inlet port disposed between said sump and said distribution chamber for admitting pressurized fluid to the interior of said shell which flows through said sump, said filter, said desiccant bed and into said distributing chamber;

e. a cylinder disposed within said shell for receiving a portion of the pressurized fluid flowing into said distributing chamber in one direction; and f. means in said cylinder for periodically backflowing the portion of pressurized fluid contained in said cylinder into said distributing chamber and thence through said desiccant bed, said filter and into said sump at a high volume constant rate of flow.

7. A filtering unit as claimed in claim 6, wherein said cylinder is provided with metering orifices opening into said distributing chamber, and said periodic backflowing means is a piston, freely movable in said cylinder which is moved away from said distributing chamber when pressurized fluid flows into said distributing chamber in said one direction.

8. A filtering unit as claimed in claim 7, including means for moving said piston toward said distributing chamber and said sump includes a normally closed drain which is opened simultaneously with the movement of said piston toward said distributing chamber.

9. A filtering unit as claimed in claim 8, wherein said normally closed drain includes a fluid operated valve which is simultaneously operated by said moving means when said moving means moves said piston toward said distributing chamber.

* * * * *